UNITED STATES PATENT OFFICE.

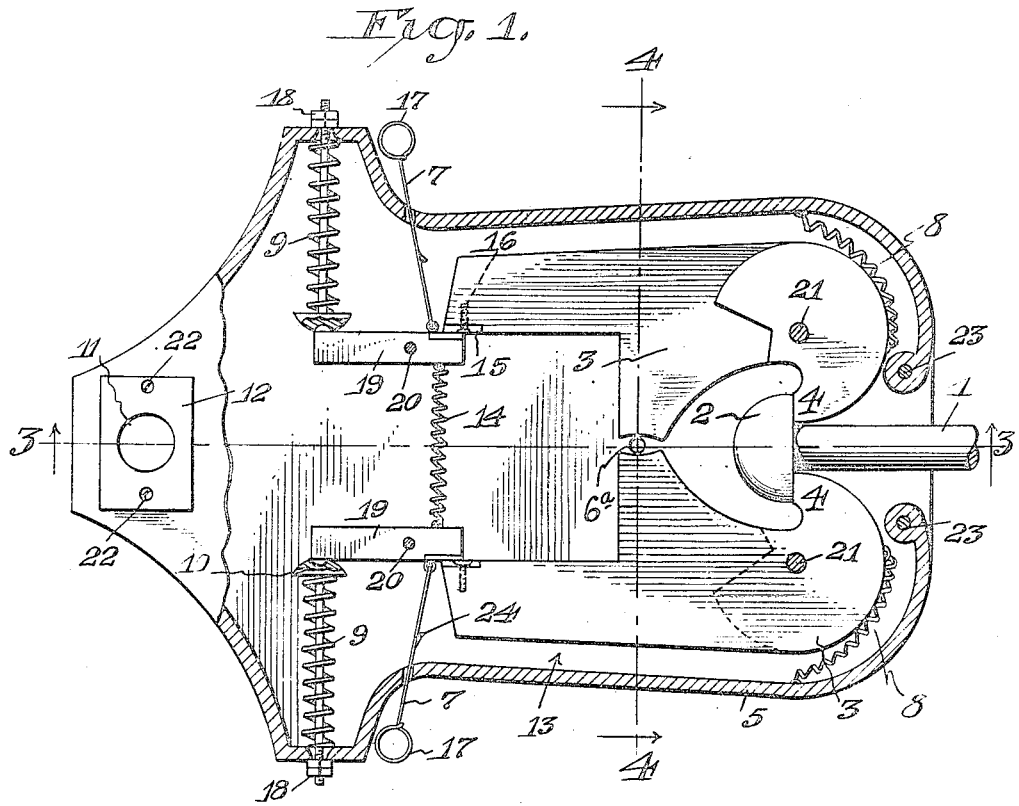
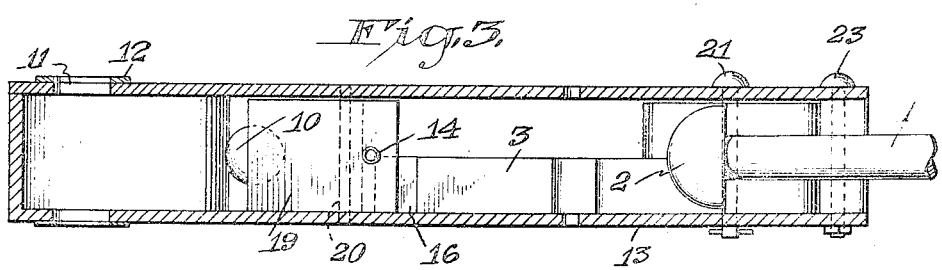
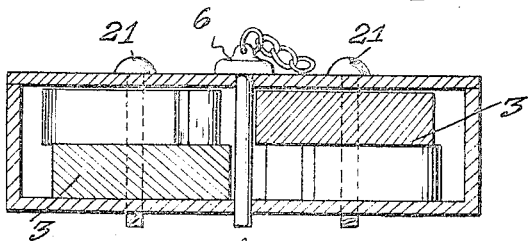

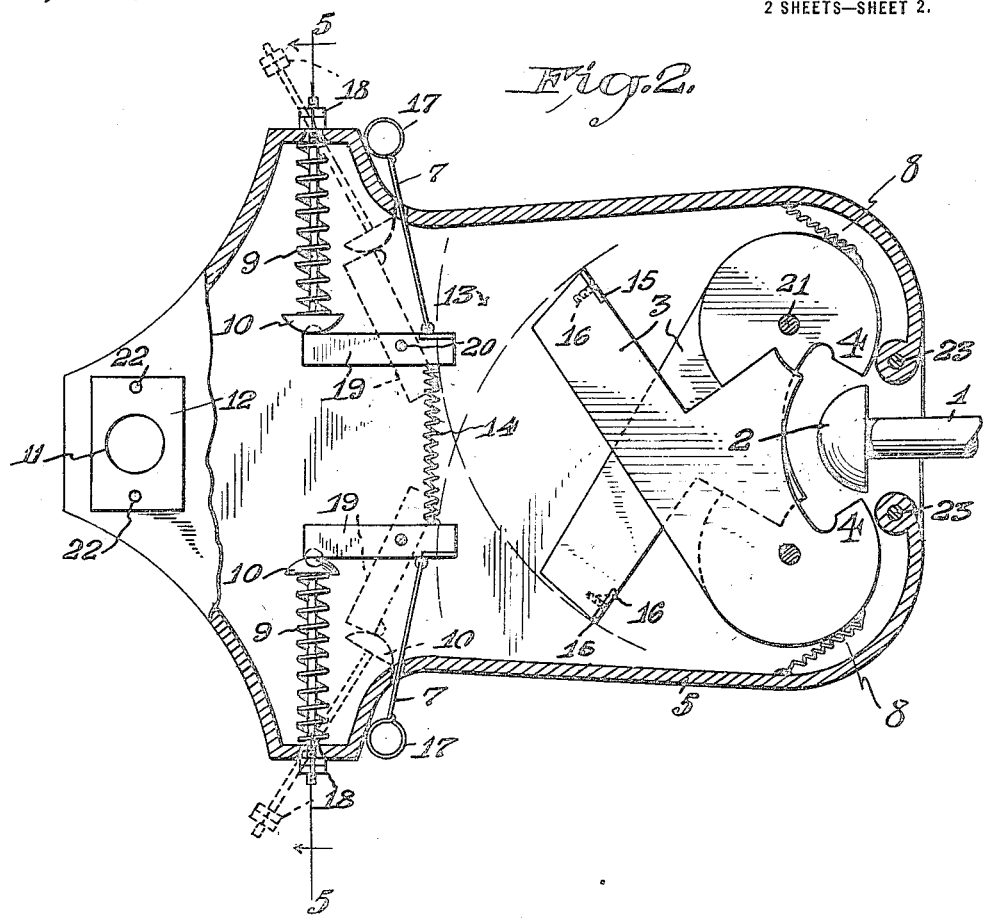

ALBERT H. SPLITTSTOESSER, OF KULM, NORTH DAKOTA.

COUPLING AND RELEASING DEVICE.

1,384,001.  Specification of Letters Patent.  Patented July 5, 1921.

Application filed January 11, 1921. Serial No. 436,561.

*To all whom it may concern:*

Be it known that I, ALBERT H. SPLITTSTROESSER, a citizen of the United States of America, residing at Kulm, in the county of La Moure and State of North Dakota, have invented a new and useful Improvement in Automatic Coupling and Releasing Devices, of which the following is a specification.

My invention appertains to improvements in an automatic coupling and releasing device of the jaw and spring type.

Its principal object is to provide an improved simple connection adapted to secure an agriculture implement or similar mechanism to a tractor or other pulling mechanism, which will function automatically to release the tractor when an over load or sudden stress is imposed upon the mechanism being pulled, such as might be encountered in plowing in a rocky or stump field, but at the same time remain coupled under normal predetermined draft.

Another object of this invention is to provide with the same device a coupling which cannot be released under any stress, this being accomplished by the insertion of a pin which locks the device and keeps it from operating to release the coupling pin.

Another object is to provide a simple strong coupling and releasing device of novel construction and arrangement of parts as hereinafter more fully set forth and claimed.

In the accompanying drawings, made a part hereof,—

Figure 1 is a top plan view, with casing broken away to show mechanism in working order.

Fig. 2 is a top plan view with casing broken away to show mechanism inoperative and coupling pin released.

Fig. 3 is a longitudinal section taken on line 3—3, of Fig. 1.

Fig. 4 is a cross section view taken on line 4—4, Fig. 1.

Fig. 5 is a cross section taken on line 5—5, Fig. 2.

Referring to the drawings Fig. 1 shows the device with casing 13 partly broken away, in which the numeral 1 indicates a coupling pin with head 2 held in working position by projecting jaws or trips 4 integral with releasing lever pieces 3, the opposite ends of lever pieces 3 are shown in frictional contact with lock lever pieces 19. These ends are protected by plate 15 held in place by screw 16 to keep the end of the lever pieces from wearing out. Lever pieces 3 of the novel shape shown in Figs. 1 and 2 are each fulcrumed on a bolt 21, and will cross over and under each other when released as best shown in Fig. 2, and also as shown in Figs. 3 and 4. In order to permit crossing the squared portions of levers 3 are made thinner and the jaws are built up. Levers 3 are held in position by springs 8 one of which is attached to levers 3 near the ends of jaws 4 and the other end of spring 8 is attached to side 5 of casing 13 as shown in Fig. 1. Levers 3 are necessarily strong in construction. Two lock pieces 19 are pivoted on bolts 20 respectively, the ends of each being frictionally in contact with respective ends of levers 3 while the other end being provided with a rounded portion fits in a depressed portion on the end of headed bolt 10. Lock pieces 19 are also connected by spring 14 acting to hold said lock pieces 19 in frictional position against lever pieces 3 and the ends of bolts 10. Spring 14 exerts a much less force than springs 9 hereinafter more fully described. Two push and pull rods 7 each provided with ring 17 and a catch 24 are respectively attached to lock pieces 19 by means of which said lock pieces 19 may be pushed back or drawn forward as desired and the mechanism placed in operating position after any releasing of coupling pin 1 due to excess stress. Catch 24 is provided so that when pulled out the same may be caught over the edge of side 5 thus permanently holding lock pieces 19 at an angle.

Two heavy spiral springs 9 inclose respectively bolts 10. Bolts 10 are headed and said heads have a depressed portion into which the rounded extended portion on lock pieces 19 fits and operates to hold said members in frictional connection as shown in Figs. 1, 2 and 5. These spiral springs are constructed of such strength that they will not permit the passing of ends of levers 3 until a predetermined pull or stress is applied on the jaws of levers 3, in other words any ordinary plowing in earth would not operate to release coupling pin 1, but whenever any extraordinary load or stress is encountered said springs will give sufficiently to permit the passing of the ends of levers 3 and thereby automatically release pin 1 and disconnect the motive power.

Casing 13 is constructed of sheet iron or other suitable material of such form as best to inclose the active members of the device and is provided with necessary openings for insertion and affixing of said members. A base plate 12 with hole 11 therein is firmly attached to casing 13 by means of bolts 22 as shown in Figs. 1 and 2.

Whenever it is desired to pull any heavy load pin 6 Fig. 4, attached by a chain to casing 13, may be placed through hole 6ª thereby locking levers 3 and effectively preventing the crossing of said levers, consequently when so used the automatic release of coupling pin 1 can not take place, but upon removal of pin 6 it will operate if sufficient pull or stress is applied. Pin 6 is to be used only when a heavy load is to be pulled.

In operation the device is first attached to the vehicle desired to be drawn by means of a usual coupling pin through hole 11 in base plate 12. Then attachment is made to a tractor or other motive power device by means of coupling pin 1 which is then inserted through the jaws of this device and is caught and held there by said jaws until either manually released or until an excess stress or pull is encountered sufficient to force spiral springs 9 back far enough to permit the passing of the ends of levers 3 thereby automatically releasing pin 1. The amount of stress or pull necessary to so automatically open the jaws 4 and cause the passing of levers 3 is predetermined by the strength of springs 9. When pin 6 is inserted through hole 6ª the device is rendered inoperative for such automatic action. The device may be manually released at any time by using the push and pull rods 7.

It will thus be seen that my invention provides a very simple, durable, and effective device for the purpose for which it is intended, and one which may be operated with safety and requires the exercise of little skill to use.

It is understood that having described my invention as above that I do not confine myself to the exact design as shown but that various changes within the scope of the invention as defined in the following claims may be made in the particular construction of the parts of this device and also in the shape and combination of the active members thereof without departing from the spirit of the invention.

I am aware also that devices of this character have been heretofore made and used, therefore I do not claim such a combination broadly, but having thus described my invention what I claim is:

1. A coupling and releasing device comprising a casing adapted for connection to some pulling device, within said casing two pivoted lever pieces adapted for holding and releasing a coupling pin, a coupling pin adapted to be held by said lever pieces, two pivoted lock pieces frictionally engaging said lever pieces, two bolts with one end of each fitted against said lock pieces respectively and the other end slidably attached to said casing, two spiral springs one each surrounding said bolts capable of resisting to a fixed stress the operation of said lever pieces and said lock pieces, another spiral spring connecting said lock pieces to hold same in position, and means for holding said parts in operating position, substantially as described.

2. A coupling and releasing device comprising a casing adapted for connection to a pulling device, within said casing two pivoted lever pieces provided with projecting portions forming jaws, a coupling pin to be held by said jaws, two pivoted lock pieces frictionally engaging said lever pieces, one end of each lock piece being provided with a rounded projecting portion, two bolts each provided with a concave portion on the head thereof into which fits the projecting portion of said lock pieces respectively, two springs one each surrounding spirally said bolts for normally holding with assistance of the lock and lever pieces said coupling pin in connected position, said springs being adapted however for compression and release of said coupling pin when a predetermined stress is applied thereto, another spiral spring connecting said lock pieces to hold same in position when coupling pin is disconnected, and means for attaching said parts to said casing, substantially as described.

3. A draft releasing device adapted for connection to a pulling device with openings for bolts and locking pins, within said casing two fulcrumed lever pieces each provided with projecting portions forming jaws to hold a coupling pin, a headed coupling pin to be held by said jaws until a predetermined force is exerted thereon upon which said pin will be released, two fulcrumed lock pieces with one end of each frictionally engaging one end of a respective lever piece, each lock piece being provided with a rounded projecting portion to fit into a depressed portion provided on a head of a bolt, two headed bolts each head being provided with a concave portion into which the rounded portion of each lock piece respectively fits, a spiral spring inclosing each bolt for normally holding with assistance of the lock and lever pieces said coupling pin in connected locked position but adapted for compression and release thereof when a predetermined stress is applied thereto, another spiral spring connecting said lock pieces to hold same in position, two weaker spiral springs connecting said lever pieces respectively to sides of said casing to assist in returning said lever pieces to normal position after being released, and means for attaching and holding said parts together.

4. A device of the character described comprising a casing provided with openings for coupling pins, said casing being adapted for connection to a pulling device, within said casing two fulcrumed lever pieces each provided with projecting portions forming jaws to hold a coupling pin, said lever pieces being so constructed and positioned that they cross when released, a headed coupling pin to be held by said jaws until a predetermined force is exerted thereon when it will be automatically released, two fulcrumed lock pieces with one end of each frictionally engaging one end of respective lever pieces, each lock piece being provided on its other end with a rounded projecting portion to fit into a depressed portion provided on the head of a bolt, two headed bolts, each head being provided with a concave portion into which the rounded portion of each lock piece respectively fits, a spiral spring inclosing each bolt for normally holding said lock and lever pieces in a locked position with said jaws embracing said coupling pin, another weaker spiral spring connecting said lock pieces to hold same in position when lever pieces are released, two other spiral springs connecting lever pieces respectively to sides of said casing, two push and pull rods each provided with a catch to fit over the edge of the casing and so hold said lock pieces open to which said push and pull rods are appropriately attached, a base plate to assist in keeping the casing from wearing, said base plate being provided with an appropriate hole for a coupling pin, a locking pin for insertion, through a hole provided in said casing, between the two fulcrumed lever pieces thereby preventing the mechanism from automatically operating to release said coupling pin until manually removed, and means for attaching and holding said parts together, substantially as described.

In witness whereof, I have hereunto set my hand this 4th day of January, 1921.

ALBERT H. SPLITTSTOESSER.

Witnesses:
OTTO ISAAK,
A. R. REESE.